Jan. 9, 1968    KYOJI HAYASHI ET AL    3,362,238
SPEED CHANGE GEAR MECHANISM FOR A BICYCLE
Filed March 25, 1966    2 Sheets-Sheet 2

United States Patent Office 3,362,238
Patented Jan. 9, 1968

3,362,238
SPEED CHANGE GEAR MECHANISM
FOR A BICYCLE
Kyoji Hayashi and Takehiko Kimura, Sakai, Japan, assignors to Shimano Kogyo Kabushiki Kaisha, Sakai, Japan
Filed Mar. 25, 1966, Ser. No. 537,343
Claims priority, application Japan, Mar. 29, 1965, 40/24,946
1 Claim. (Cl. 74—217)

This invention relates to a speed change gear mechanism for a bicycle comprising a multistage chain wheel or sprocket whel mounted on one end of a rear wheel axle of the bicycle and a chain shifting device having a chain guide wheel support frame adapted to be shifted by means of a Bowden wire normally pulled in one direction by means of a spring, and it relates particularly to a control device for said Bowden wire which comprises a winding drum to which one end of said Bowden wire is secured, a hand lever projected sidewardly from said winding drum, a control plate integral with or fixed to said winding drum and provided with a plurality of holes arranged in an arc of circle, and a spring-pressed clip-stop ball provided in a receiving box and adapted to engage with selected one of said plurality of holes in the control plate, said receiving box being of such size that its width is considerably larger than the diameter of said clip-stop ball.

An object of the present invention is to provide an improved switch-over control device for the speed change gear mechanism arranged outside of the gear wheel hub, which is simple in construction and reliable in operation.

The accompanying drawing will serve to illustrate specific embodiment of our invention, in order that its utility and functioning will be thoroughly appreciated. It will be understood, however, that this is by way of illustration only and is not to be taken as limiting the invention in any way. In the drawing.

Figure 1:
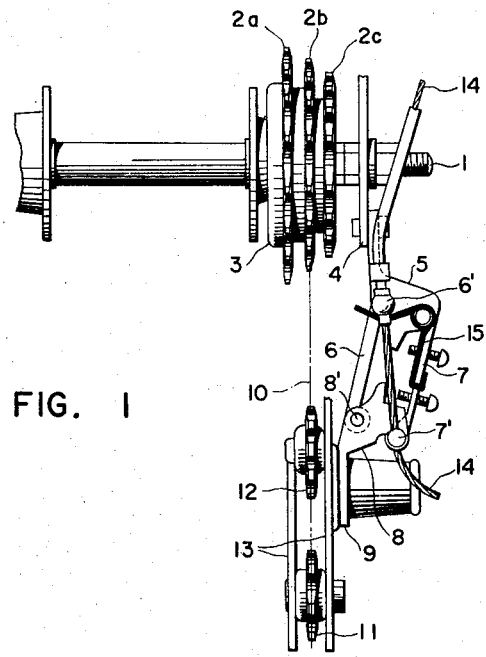
FIGURE 1 is a rear view showing the outside arranged speed change gear mechanism for a bicycle, as distinguished from so-called built-in speed change gear.

Referring to the drawing, particularly to FIG. 1, the reference numeral 1 designates a rear wheel axle, on which at the righthand end portion, by intermediary of a common free wheel device 3, there are mounted three chain wheels or sprocket wheels, 2a, 2b and 2c having different number of gear teeth, the sprocket wheel 2c of smallest number of gear teeth being arranged in the outermost position. Adjacent said outermost sprocket wheel 2c, there is securely mounted a bracket 4 carrying a support plate 5 on which there are pivoted an inner link 6 and an outer link 7. At the other ends 8' and 7', said links 6 and 7 are pivoted to a rocking arm plate 8 having an extension 9. The support plate 5, the inner and outer links 6, 7 and the rocking arm plate 8 are so arranged that they constitute a frame adapted for parallelogramic motion. 10 is an endless chain passed around one of the three sprocket wheels 2a, 2b and 2c and a lower sprocket wheel 11 for tensioning the drive chain 10. 12 is a guide sprocket wheel. This guide sprocket wheel 12 and said lower chain wheel 11 are mounted on a base frame 13 which is fixed to said extension 9 of the rocking arm plate 8. An actuating Bowden wire 14 is passed through the pivotal point 6' between the inner link 6 and the support plate 5 and, at its free end, it is securely connected to a pivotal point 7' between the outer link 7 and the rocker arm plate 8 as shown. A spring 15 has a tendency of normally pulling the Bowden wire 14 in the direction of arrow to turn the rocker arm 8 around the pivot 8' in the clockwise direction, so that the support frame 13 is urged toward the left in FIG. 1. The above mentioned parts of the speed change gear mechanism are forming no part of the characterizing feature of the present invention, and no further detailed explanation would be required.

Figure 2:
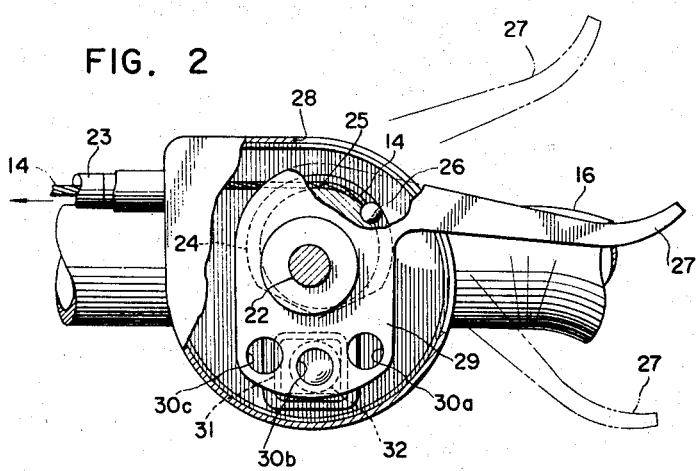
FIGURE 2 is a front view partly in section of a switch-over mechanism according to the present invention.
Figure 3:
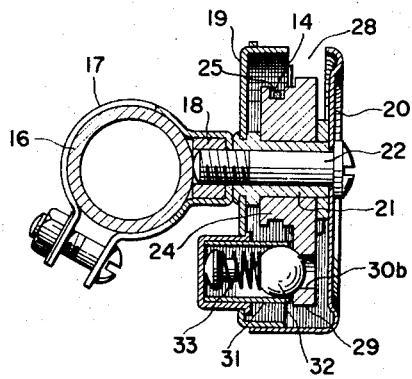
FIGURE 3 is a sectional side view thereof.
Figure 4:
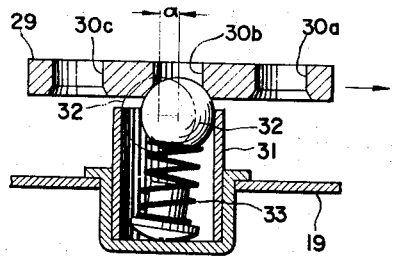
FIGURE 4 is a detail in sectional view of said switching-over mechanism.

Now, referring to FIGS. 2 to 4, a switching-over device actuatable by means of a hand lever is provided on a handle bar 16 of a bicycle. Employing a clamp 17 having a nut 18, a substantially cylindrical casing 19 having a cap 20 and a central sleeve 21 is securely mounted to the handle bar 16 by means of a screw bolt 22. The Bowden wire 14 is passed through a sleve 23 secured to the front side wall of the casing 19. A winding drum 24 is provided with a circumferential groove 25 to which the inner end of the Bowden wire 14 is securely connected at 26. Radially projecting from the winding drum 24, there is the hand lever 27 which is projected outwardly from the casing 19 through an aperture 28 in the peripheral wall of the cap 20. The winding drum 25 has integral therewith a side extension 29 forming a control lever plate. This control lever plate is provided with three circular holes 30a, 30b and 30c which are arranged in an arc of circle having its center concentric with respect to the center of rotation of the winding drum 25. In a receiving box 31 fixed onto the bottom of the casing 19, there is disposed a clip-stop ball 32 biased by a coil spring 33 against the under side of the control lever plate 29 extending from the winding drum 25. As shown, the width of said box 31 is considerably larger than the diameter of the clip-stop ball 32, so that the ball is adapted to be moved sidewardly for a predetermined extent.

Figure 5A:
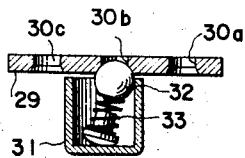
FIGURES 5a to 5d are sectional views similar to FIGURE 4, showing the manner of operation of the switch-over mechanism in order of switch-over manipulation.
Figure 5B:
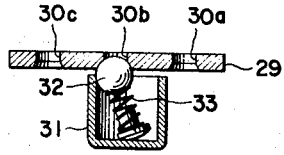
Figure 5C:
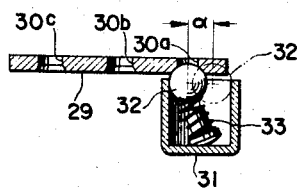
Figure 5D:
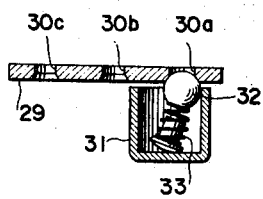

As described above, the spring 15 shown in FIG. 1 is normally tending to pull the Bowden wire 14 in the direction of arrow, tending to rotate the winding drum 24 anticlockwise in FIG. 2, in which it is assumed that the hand lever 27 is in the normal position shown in solid lines and that the clip-stop ball 32 is in engagement with the central hole 30b alloted for the normal speed. In this position (FIG. 4), the ball 32 is slightly displaced to the right and is abutting against the righthand edge of the box 31 as shown in solid line in FIG. 4, so that the control lever plate 29 is held in the normal speed position even though the pressure on the hand lever 27 is released. Now, when said hand lever 27 is manually turned downwardly in FIG. 2 for the purpose of getting the low speed position, the control lever plate 29 moves to the left in FIG. 4 against the action of the spring 15 acting on the Bowden wire 14, and the ball 32 will first merely be displaced to the left for the distance of α, releasing the said clogging or locking position shown in solid line. Upon continued motion of the control plate 29, the ball 32 will enter the hole 30a as shown in FIG. 5c, in which position the hand lever 27 is prevented from farther movement, and the hand lever is stopped. If the pressure on the hand lever 27 is released, the control lever plate 29 slightly returns to the right by the action of the spring 15 acting on the Bowden wire 14 until the ball 32 displaced to the right abuts against the righthand edge of the box 31, assuming the clogged or locked position shown in FIG. 5d, only difference residing in that the ball 32 is in engagement with the hole 30a alloted for the low speed. By said manipulation, the Bowden wire 14 is pulled against the action of the spring 15 in the direction reverse to the direction of arrow, and the support frame 13 carrying the sprocket wheels 11 and 12 will be shifted rightwardly and downwardly in FIG. 1 by the parallelogramic motion of the links 6, 7 and the plates 5, 8, and the swing motion of the rocker arm 8, so that the driving chain 10 will be shifted to the low speed sprocket wheel 2c.

For obtaining high speed, the hand lever 27 is manually turned upwardly in FIG. 2. By this manipulation, the control lever plate 29 in FIG. 4 is moved to the right, thereby the ball 32 will be transferred to the hole 30c alloted for the high speed.

What we claim is:

1. In conjunction with a speed change mechanism comprising a multistage sprocket wheel mounted on one end of a rear wheel axle of a bicycle and a chain shifting device having a sprocket wheel support frame adapted to be shifted by means of a Bowden wire normally pulled in one direction by means of a spring, a combination of a winding drum to which one end of said Bowden wire is secured, a hand lever projected sidewardly from said winding drum, a control plate integral with or fixed to said winding drum and provided with a plurality of holes arranged in an arc of circle, and a spring-pressed clip-stop ball provided in a receiving box and adapted to engage with selected one of said plurality of holes in the control plate, said receiving box having its width considerably larger than the diameter of said clip-stop ball.

References Cited

UNITED STATES PATENTS

| | | | |
|---|---|---|---|
| 2,428,166 | 9/1947 | Letourneur | 74—217 |
| 2,431,513 | 11/1947 | Schwinn | 74—217 |

FRED C. MATTERN, JR., *Primary Examiner.*

J. A. WONG, *Assistant Examiner.*